Nov. 18, 1969    H. BLATTER ET AL    3,479,578

RECTIFIER ARRANGEMENT UTILIZING SEMICONDUCTOR ELEMENTS

Filed Feb. 23, 1968    3 Sheets-Sheet 1

INVENTORS
Hans Blatter
Rolf Wüthrich
BY
Pierce, Scheffler & Parker
Attorneys

INVENTORS
Hans Blatter
Rolf Wüthrich
BY
Pierce, Scheffler & Parker
Attorneys

United States Patent Office 3,479,578
Patented Nov. 18, 1969

3,479,578
RECTIFIER ARRANGEMENT UTILIZING SEMI-CONDUCTOR ELEMENTS
Hans Blatter and Rolf Wüthrich, Wettingen, Switzerland, assignors to Aktiengesellschaft Brown, Boveri & Cie., Baden, Switzerland, a joint-stock company
Filed Feb. 23, 1968, Ser. No. 707,549
Claims priority, application Switzerland, Mar. 17, 1967, 3,865/67
Int. Cl. H02m 1/18
U.S. Cl. 321—11
6 Claims

ABSTRACT OF THE DISCLOSURE

A three-phase rectifier arrangement connected to a three-phase alternating current supply source uses semiconductors as the rectifier elements. Capacitors are connected in parallel with the semiconductor elements for dissipating excess voltages and premagnetized transductor control choke coils for voltage regulation are connected in series with the parallel connections of the semiconductor elements and their capacitors. Ohmic-inductive reactance circuits are connected between the choke coils and the semiconductor elements to prevent undesired reverse magnetization of the choke coils which otherwise would occur as a result of the charging currents taken by the capacitors.

---

The invention relates to a rectifier arrangement fed from a three-phase network, with semiconductor elements and premagnetized transductor control choke coils for voltage regulation, employing capacitors for dissipating the excess voltages produced by the carrier hole storage effect.

In general, the course regulation of the D.C.-voltage in semiconductor installations comprising uncontrolled elements is effected with the aid of a transformer or step switch, which stepwise commutates the secondary voltage, whilst the precise regulation is carried out by means of power transductors. The latter are controlled by way of premagnetization, in such a manner, that, in analogy with the grid control of rectifiers, they free the forward direction for the rectifier from a specific instant of the period onwards, thereby changing the modulation of the semiconductor. The premagnetization is brought about by alternating current, through a variable control winding, which is likewise fed by the main transformer, when using the so-called three-choke connection, otherwise with direct current.

With the three-choke connection, both directions of the current can be exploited in each of the choke coils, so that only three choke coils are required for six rectifier arms. The choke coils are fitted into the outgoing lines of the transformer.

Figure 1:
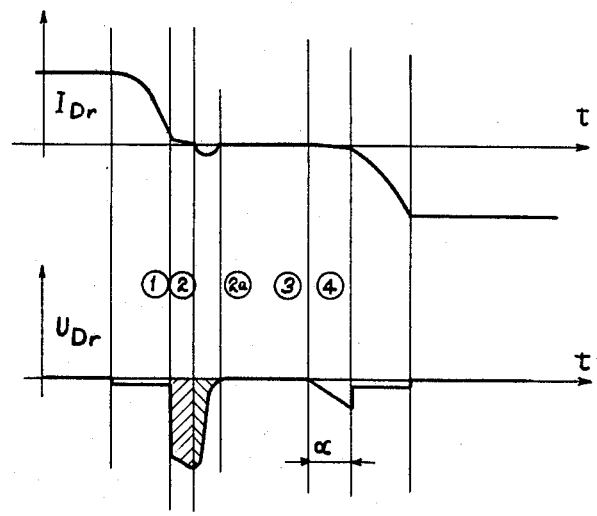
Figure 2:
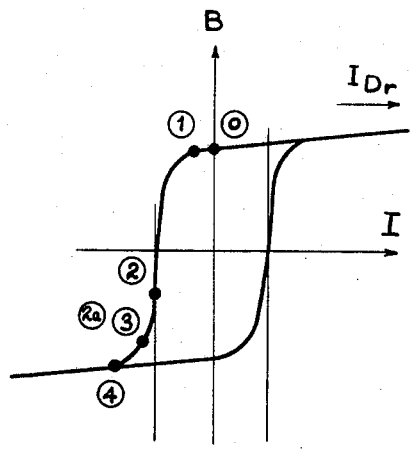
Figure 3:
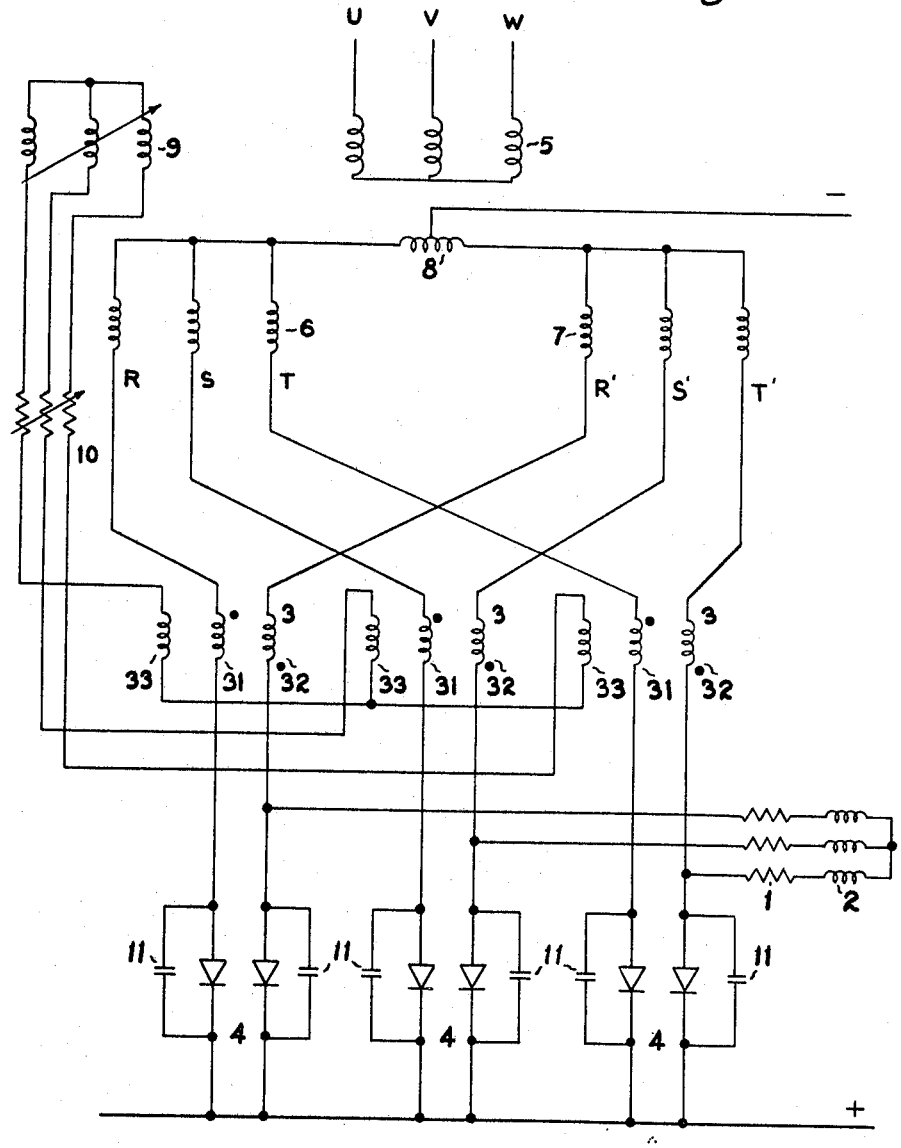
Figure 4:
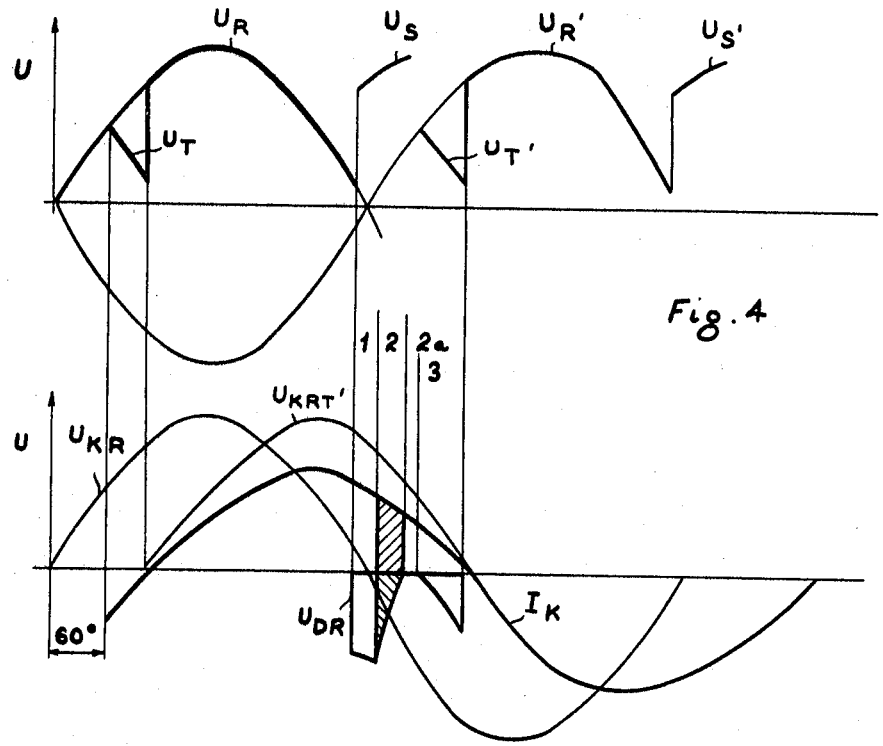
Figure 5:
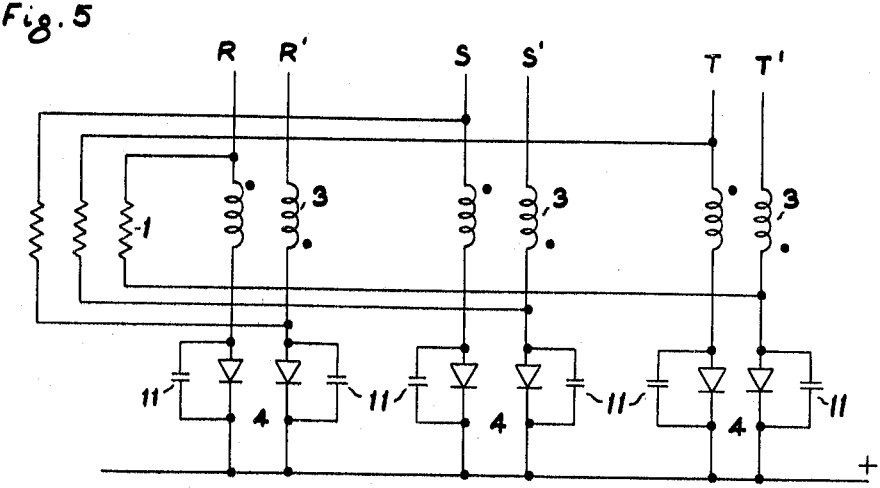

The invention will no be explained with reference to the following detailed description of a preferred embodiment thereof, and from the accompanying drawings wherein:

FIGS. 1 and 2 are graphs illustrating the mode of functioning of the choke coils in a three-choke circuit;
FIG. 3 is a schematic electrical circuit diagram for the improved rectifier arrangement;
FIG. 4 is a graph showing the voltage and current curves related to the embodiment of FIG. 3; and
FIG. 5 is also a circuit diagram illustrating a different embodiment of the invention.

With reference now to the drawings and to FIGS. 1 and 2 in particular, the upper portion of FIG. 1 shows the curve of the current $I_{Dr}$ in the transductor choke for one phase. The lower portion of the figure shows the voltage $U_{Dr}$ on the choke coil. FIG. 2 illustrates the magnetization curve. As long as the transductor choke is under current, the current $I_{Dr}$ prevails. At the point 1 the current is extinguished, with the exception of a residue which ensures remagnetization up to the point 2, following the magnetization curve from 1 to 2. The control becomes effective at point 3. Between 3 and 4 the transductor choke is oppositely magnetized, until it frees the flux of current at 4. In this case, the control angle is located between the points 3 and 4. With the largest control angle, the point 2 would coincide with the point 0.

However, this kind of semiconductor operation constitutes an idealized assumption; it cannot be achieved, since as a rule capacitors are connected parallel to the semiconductor element. These capacitors are necessary to keep the excess voltages caused by the carrier hole storage effect away from the diodes. As the current is then interrupted, a charging current surge occurs in the capacitors owing to the reverse voltage applying to the diode. This current surge flows through the transductor chokes in the direction opposite to that of the rectifier current previously passing therethrough. This causes an additional reverse magnetization, which has the drawback of shortening the desired control range. The lower portion of FIG. 1 indicates that an additional reverse magnetization occurs due to the capacitors between points 2 and 2a. FIG. 2 shows, that in consequence the additional reverse magnetization extends from point 2 to point 2a. With the largest control angle, i.e. when the control is to take effect at the point 0, this additional reverse magnetization would displace the onset of the control beyond the point 1, leaving available only the range between this point and the point 4. In other words, only this range would be available for control purposes.

Similar conditions prevail with D.C.-premagnetization, i.e. in the case of choke coils operating in one direction only. A loss of control range is caused in this case as well by the undesirable reverse magnetization.

In order to eliminate this drawback, it is proposed according to the invention in connection with rectifier arrangements operating with premagnetized transductor control choke coils for voltage regulation, employing capacitors for dissipating excess voltages, to connect between the control choke coil and the semiconductor elements an additional ohmic-inductive i.e. and RL circuit.

This circuit is then likewise connected to the transformers feeding the rectifiers. The transformer voltage drives an additional current through the control choke coil, which has the task of compensating the charging current surge of the capacitors, thereby preventing the undesirable reverse magnetization.

FIG. 3 shows one embodiment of the invention in which the additional circuits, consisting of resistances 1 and inductances 2, are connected between the transductor choke coils 3 and the semiconductors 4. The individual circuits (1, 2) are star-connected. The primary windings 5 of the transformers are fed from the three-phase mains UVW. Reference numerals 6 and 7 designate secondary windings while 8 is the interphase transformer connected between phases RST and R'S'T'.

Consequently, the circuit illustrated is an interphase transformer circuit. The windings 6 correspond to the phases RST, the windings 7 to the phases R'S'T', where R and R', S and S', T and T' each have a phase shift of 180°. The transductor choke coil 3 has two working windings 31 and 32, of which 31 is allocated to the phases RST and 32 to the phases R'S'T'. The sense of winding of coils 31 and 32 is opposite as indicated by the points on the side. This then effects an opposite magnetization of the core while the direction of the current is the same in the coil. The transductor choke coils are furthermore provided with premagnetization coils 33, which are fed from the variable voltage transformer 9 through the likewise variable resistances 10. The various settings of the transformer 9 and of the resistances 10 determine the site of action of the rectifier 4 concerned in each case. Thus, also determining the control angle α in a known manner. Parallel-connected with the rectifier valves are further the capacitances 11, which serve to prevent the carrier hole storage effect.

The mode of functioning is such, that by means of the parallel circuits 1, 2 the magnetization between the points 2, 2a of FIG. 1 can be compensated. The upper part of FIG. 4 shows the voltage curve of phase R ($U_R$) predominantly, which appears on the D.C.-collector bar when the associated rectifier is in the open state. The control angle α determines the onset of the curve. It remains in existence until the next phase, i.e. $U_S$, is initiated. (Interphase transformer circuit.) Thus, the ignition period in each case is also always 120°. The rectifier of phase R succeeds the rectifier of phase T ($U_T$). The voltage prevailing during the energized period of the R rectifier is the voltage $U_R$. The rectifier R carries current until the rectifier associated with phase S is energized. This happens at the instant indicated by the line 1. At this point, the current of phase R ceases, with the exception, as already stated of a quantity making possible the reverse magnetization up to the point 2. This current is then extinguished. There now commences, however, the discharging process of the capacitor 11 (FIG. 3), sending a current through the choke coil which, though small, suffices to continue the reverse magnetization up to the point 2a. This current is then compensated by though in itself likewise small current $I_K$, so that the magnetizing current cannot vary any further between 2 and 2a, as indicated by the shaded area. The premagnetization then becomes effective at the point 3, which initially inhibits the current by the rectifier of phase R', until the core of the choke coil is saturated. There then appears the potential $U_{R'}$ on the D.C.-collector bar. Although the current $I_K$ continues to flow, it will have hardly any effect on the processes, since the valves of the currents flowing through the rectifier are considerably higher. The current $I_K$ is produced by the potential $U_{KR}$. This potential applies to the associated resistance 1 and the inductance 2. It is identical with the potential $U_R$. However, the current $I_K$ must lag behind this potential, in order to provide a current at the points 1 to 2a. Accordingly, the resistances 1 and the inductances 2 are so selected, that the current $I_K$ lags behind the potentials $U_K$ by about 60°. This provides for a positive current at point 1.

A different embodiment is shown in FIG. 5. Here, the resistances are connected to a potential, which is phase-displaced by 60° relative to the associated potential of the rectifier element. For the rectifier of phase R, the resistance 1 is connected to the phase R and T'. This potential produces a current, which is already off phase by 60° relative to the potential $U_R$, which allows to dispense with a separate inductance 2. The current $I_K$ is then in phase with the potential $U_{KRT'}$. The same effect is then produced as in the embodiment of FIG. 3. The resistances then form an RL-circuit with the windings of the transductor choke coil itself.

We claim:
1. A three-phase rectifier arrangement supplied from a three-phase alternating current supply network comprising semiconductor elements individual to each phase and which are connected to the secondary windings of a supply transformer, premagnetized transductor control choke coils connected in series with said semiconductor elements for voltage regulation, capacitors connected in parallel with said semiconductor elements for dissipating excess voltages, and ohmic-inductive reactance circuits connected between said choke coils and semiconductor elements for preventing undesired reverse magnetization of said choke coils which would otherwise occur as a result of the charging currents taken by said capacitors.

2. A rectifier arrangement as defined in claim 1 wherein said ohmic-inductive reactance circuit is connected with one pole between the semiconductor element and the control choke coil, the resistance and inductive components of said ohmic-inductive reactance circuit being so matched that a phase-displacement of 60° is produced between the current and voltage.

3. A rectifier arrangement as defined in claim 2 wherein the resistance and inductive components of said ohmic-inductive reactance circuits are connected in series and are star-connected for each phase.

4. A rectifier arrangement as defined in claim 1 wherein said ohmic-inductive reactance circuits include resistance elements connected between said choke coils and semiconductor elements, said resistances in association with the inductances of said choke coils establishing an RL-circuit.

5. A rectifier arrangement as defined in claim 3 for a six-phase circuit wherein said resistances are connected with one pole between the semiconductor elements and the control choke coils, and with the other pole connected directly to that phase which is displaced by 60° relative to the voltage fed to the corresponding winding of the control choke coil.

6. A rectifier arrangement as defined in claim 1 wherein said ohmic-inductive reactance circuits include separate resistance and inductance elements connected in series between said choke coils and said semiconductor elements.

References Cited
UNITED STATES PATENTS

| | | | |
|---|---|---|---|
| 2,548,579 | 4/1951 | Bedford | 321—5 XR |
| 2,883,600 | 4/1959 | Kleinvogel et al. | 321—16 XR |
| 2,959,724 | 11/1960 | Dortort | 321—16 |
| 3,229,187 | 1/1966 | Jensen | 321—26 |
| 3,290,579 | 12/1966 | Hausner | 321—5 XR |
| 3,295,049 | 12/1966 | Wuthrich et al. | 321—16 XR |

JOHN F. COUCH, Primary Examiner

W. M. SHOOP, JR., Assistant Examiner

U.S. Cl. X.R.

321—5, 27